United States Patent
Hartley et al.

(10) Patent No.: US 10,774,715 B1
(45) Date of Patent: *Sep. 15, 2020

(54) STABILIZATION OF AQUEOUS UREA SOLUTIONS CONTAINING ORGANOMETALLIC CATALYST PRECURSORS

(71) Applicant: Southwest Research Institute, San Antonio, TX (US)

(72) Inventors: Ryan C. Hartley, Kerrville, TX (US); Cary A. Henry, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/937,123

(22) Filed: Mar. 27, 2018

(51) Int. Cl.
| | |
|---|---|
| *F01N 3/20* | (2006.01) |
| *F01N 3/28* | (2006.01) |
| *F01N 11/00* | (2006.01) |
| *B01J 31/02* | (2006.01) |
| *B01J 31/12* | (2006.01) |

(52) U.S. Cl.
CPC .......... *F01N 3/208* (2013.01); *B01J 31/0249* (2013.01); *B01J 31/12* (2013.01); *F01N 3/2896* (2013.01); *F01N 11/00* (2013.01); *B01J 2531/46* (2013.01); *B01J 2531/90* (2013.01); *F01N 2560/021* (2013.01); *F01N 2570/14* (2013.01); *F01N 2610/02* (2013.01); *F01N 2610/06* (2013.01); *F01N 2610/08* (2013.01); *F01N 2610/1406* (2013.01); *F01N 2900/14* (2013.01)

(58) Field of Classification Search
CPC ....... C07C 273/04; G01F 23/00; Y02T 10/20; F01N 3/208; F01N 3/2896; F01N 11/00; F01N 2610/02; F01N 2610/06; F01N 2610/08; F01N 2610/1406; F01N 2900/14; F01N 2570/14; B01J 31/0249; B01J 31/12; B01J 2531/90; B01J 2531/46
See application file for complete search history.

(56) References Cited

U.S. PATENT DOCUMENTS

| | | |
|---|---|---|
| 5,087,431 A | 2/1992 | Gardner-Chavis et al. |
| 5,171,558 A | 12/1992 | Gardner-Chavis et al. |
| 5,342,599 A | 8/1994 | Slone |

(Continued)

FOREIGN PATENT DOCUMENTS

| | | |
|---|---|---|
| EP | 0 894 523 A1 | 2/1999 |
| FR | 304 4564 A1 | 6/2017 |

(Continued)

OTHER PUBLICATIONS

Bernhard, et al; Catalytic Urea Hydrolysis in the Selective Catalytic Reduction of NOx: Catalyst Screening and Kinetics on Anatase $TiO_2$ and $ZrO_2$; The Royal Society of Chemistry, 2013, Catalysis Science & Technology, vol. 3, pp. 942-951.

(Continued)

*Primary Examiner* — Hai H Huynh
*Assistant Examiner* — Diem T Tran
(74) *Attorney, Agent, or Firm* — Grossman Tucker Perreault & Pfleger PLLC

(57) ABSTRACT

The present invention is directed at stabilization of aqueous urea solutions containing organometallic catalyst precursors. Stabilization can be achieved by monitoring and controlling the solution pH.

17 Claims, 5 Drawing Sheets

(56) References Cited

U.S. PATENT DOCUMENTS

| | | | |
|---|---|---|---|
| 5,827,490 | A | 10/1998 | Jones |
| 6,024,774 | A | 2/2000 | Nakagawa et al. |
| 6,203,770 | B1 | 3/2001 | Peter-Hoblyn et al. |
| 6,361,754 | B1 | 3/2002 | Peter-Hoblyn et al. |
| 7,572,318 | B2 | 8/2009 | Jadhav et al. |
| 7,708,806 | B2 | 5/2010 | Wright et al. |
| 7,744,845 | B2 | 6/2010 | Stephenson |
| 7,909,911 | B2 | 3/2011 | Lackner et al. |
| 7,938,893 | B2 | 5/2011 | Doong et al. |
| 8,083,836 | B2 | 12/2011 | Wright et al. |
| 8,088,197 | B2 | 1/2012 | Wright et al. |
| 8,163,065 | B2 | 4/2012 | Lackner et al. |
| 8,176,731 | B2 | 5/2012 | Doering et al. |
| 8,337,589 | B2 | 12/2012 | Wright et al. |
| 8,454,732 | B2 | 6/2013 | Huang et al. |
| 10,378,411 | B1 | 8/2019 | Henry et al. |
| 2004/0040288 | A1 | 3/2004 | Jacob et al. |
| 2009/0101008 | A1 | 4/2009 | Lackner et al. |
| 2009/0145114 | A1* | 6/2009 | Sato .................. B01D 53/9431 60/286 |
| 2009/0269265 | A1 | 10/2009 | Ando et al. |
| 2011/0268636 | A1 | 11/2011 | Lackner et al. |
| 2013/0064724 | A1 | 3/2013 | Huang et al. |
| 2014/0369910 | A1 | 12/2014 | Ayyappan et al. |
| 2016/0051931 | A1* | 2/2016 | Ito ........................ B01J 37/0244 422/180 |
| 2016/0074809 | A1 | 3/2016 | Goffe |

FOREIGN PATENT DOCUMENTS

| | | | |
|---|---|---|---|
| JP | 2006110526 | * | 4/2006 |
| JP | 2013541662 | A | 11/2013 |
| WO | 2012104205 | A1 | 8/2012 |

OTHER PUBLICATIONS

Bernhard, et al; "Hydrolysis and Thermolysis of Urea and its Decomposition Byproducts Biuret, Cyanuric Acid and Melamine Over Anatase TiO2"; Applied Catalysis B: Environmental vol. 115-116, (2012) pp. 129-137.

Engine and Aftertreatment Technologies—Lubrizol <<https://www.lubrizol.com/Lubricant-and-Fuel-Additives/Engine-Oil>> accessed Mar. 7, 2018.

Hauck, et al; "Surface Chemistry and Kinetics of the Hydrolysis of Isocyanic Acid on Anatase"; ScienceDirect; Applied Catalysis B: Environmental 70, 2007, pp. 91-99.

Ida, et al., "Mechanism of High-Temperature CO2 Sorption on Lithium Zirconate," Environ. Sci. Technol., 2003, 37(9), pp. 1999-2004.

Johnson, T.V.; "Diesel Emissions in Review"; SAE International, 2011-01-0304; Published Apr. 12, 2011 (15 pgs).

Kleemann, M., et al; "Hydrolysis of Isocyanic Acid on SCR Catalysts";—Ind. Eng. Chem Res. 2000, vol. 39, pp. 4120-4126.

Majewski; "Selective Catalytic Reduction"; DieselNet Technology Guide, Diesel Catalysts; <<https://www.dieselnet.com/tech/cat_scr.php>> (accessed Aug. 30, 2016).

Matolygina, et al; "Synthesis of Superfine Titania via High-Temperature Hydolysis of Titanium (IV) Bis(ammonium lactato) Dihydroxide"; Doklady Chemistry: vol. 441 Part 2, pp. 361-364, Nov. 2011.

Nair, et al., "Lithium Based Ceramic Materials and Membranes for High Temperature CO2 Separation," Progress in Materials Science 54 (2009) 511-541.

Piazzesi, G., PhD; Thesis: "The Catalytic Hydrolysis of Isocyanic Acid (HNCO) in the Urea-SCR Process"; dissertation submitted to the Swiss Federal Institute of Technology, ETH No. 16693, Zurich, 2006 (164 pgs).

Strots, et al; "Deposit Formation in Urea-SCR Systems"; SAE International, 2009, Journal of Fuels and Lubricants., vol. 2, Issue 2, pp. 283-289.

Zahn, et al; "Catalytic Hydrolysis of S-Triazine Compounds Over Al2O3"; Catalysis Today, vol. 27 (1996), pp. 167-173.

Notice of Allowance dated Nov. 30, 2018 for U.S. Appl. No. 15/843,401 (13 pgs).

U.S. Office Action dated Dec. 18, 2018 issued in U.S. Appl. No. 15/861,208 (6 pgs).

* cited by examiner

STABILIZATION OF AQUEOUS UREA SOLUTIONS CONTAINING ORGANOMETALLIC CATALYST PRECURSORS

FIELD OF THE INVENTION

The present invention is directed at stabilization of aqueous urea solutions containing organometallic catalyst precursors. Stabilization can be achieved by monitoring and controlling the solution pH.

BACKGROUND

Internal combustion engines such as those found in cars and trucks may produce combustion byproducts and/or products of incomplete combustion which may exist in the engine exhaust and emit into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides (NOx). Accordingly, diesel engines may include selective catalytic reduction (SCR) systems in order to seek reduction in nitrogen oxide concentrations. Improving performance of such systems remains an ongoing area of research and development.

SUMMARY

The present invention is directed at a method of controlling the pH level of a diesel emission fluid reservoir. The reservoir contains an aqueous based urea solution including a catalyst precursor comprising a water soluble organometallic compound wherein the reservoir includes a pH probe to monitor pH of the solution. The pH is controlled to a value of ≤10.0.

In a related embodiment, the present invention is again directed at a method of controlling the pH level of a diesel emission comprising an aqueous based urea solution including a catalyst precursor comprising a water soluble organometallic compound, wherein the reservoir includes a pH probe to monitor pH of said solution. The pH is controlled to a value of ≤10.0 by selecting and implementing at least one or more of the following pH adjusting procedures: (i) introducing exhaust gas comprising $CO_2$ into said reservoir; (ii) introducing air into said reservoir; or (iii) introducing NOx into said reservoir.

In still further related embodiment, the present invention is directed at a diesel emission fluid apparatus comprising a diesel emission fluid reservoir to contain an aqueous based urea solution including a catalyst precursor comprising a water soluble organometallic compound, wherein the reservoir includes a pH probe to monitor pH of said solution. A controller is provided which monitors and is configured to control the pH to a level of ≤10.0 by selecting and implementing at least one of the following: (i) introducing exhaust gas comprising $CO_2$ into the reservoir; (ii) introducing air into the reservoir; or (iii) introducing NOx into said reservoir.

DESCRIPTION OF THE DRAWINGS

The various aspects and advantages of the present disclosure may be better understood by reference to the following detailed description, in conjunction with the accompanying drawings, wherein.

DETAILED DESCRIPTION

Urea is used as a convenient source of ammonia ($NH_3$) reductant in SCR systems for decreasing NOx emissions from diesel engines. Urea ($H_2NCONH_2$) is therefore a component of what is termed a diesel emission fluid (DEF) that is preferably introduced as a spray into the exhaust gases upstream of the SCR catalyst. The DEF vaporizes and the urea thermally decomposes into $NH_3$ and HNCO (isocyanic acid), with subsequent hydrolysis of the HNCO into additional amounts of $NH_3$ along with $CO_2$:

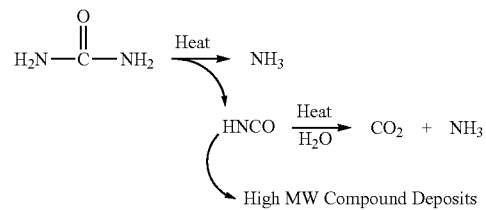

The ammonia as formed above may then be utilized as the reductant in selective catalytic reduction (SCR) to reduce NOx to nitrogen and water. Such reactions include the following:

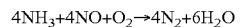

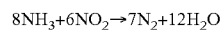

However, urea is observed to deposit on the walls of the exhaust system and/or the SCR catalyst as solid urea or as a deposit mixture of urea and isocyanic acid. Over time, in the presence of relatively hot exhaust gases, secondary reactions can occur in which such deposits (urea and isocyanic acid) convert to a range of relatively higher molecular weight compounds. Such higher molecular weight compound deposits may include one or more of the following:

TABLE 1

| Deposits On Exhaust System Or SCR Catalyst | |
|---|---|
| Compound | Structure |
| Biuret | $H_2N-\overset{O}{\underset{\|}{C}}-\overset{H}{\underset{\|}{N}}-\overset{O}{\underset{\|}{C}}-NH_2$ |

TABLE 1-continued

Deposits On Exhaust System Or SCR Catalyst

| Compound | Structure |
|---|---|
| Triuret | 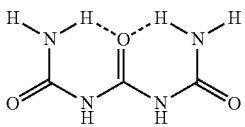 |
| Cyanuric Acid | 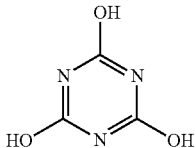 |
| Ammelide | 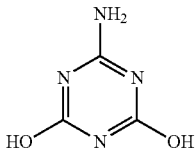 |
| Ammeline | 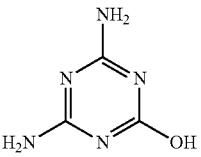 |
| Melamine | 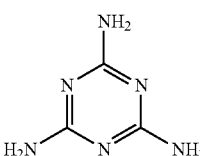 |

The deposits, once formed, then serve to reduce the efficiency of the exhaust gas treatment by either reducing exhaust gas flow and/or reducing efficiency of the SCR catalyst from efficient reaction with ammonia to reduce NOx gas concentration. In addition, although heating to elevated temperature such as in the range of 193° C. to 700° C. can serve to decompose the above identified relatively high molecular weight deposits, as well as polymeric type deposits, it can be appreciated that this adds a level of complexity to the system and potential for other associated problems.

Figure 1:
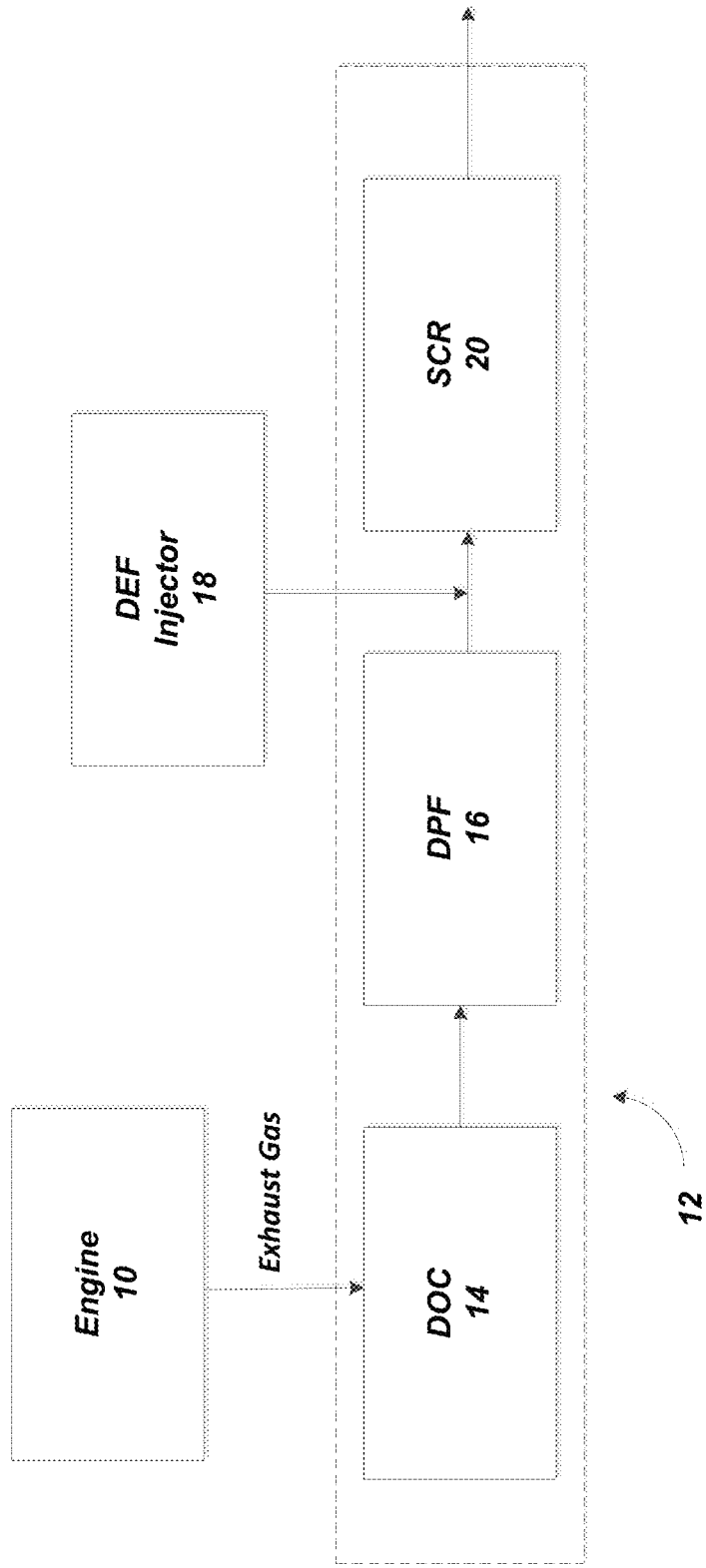
FIG. 1 illustrates in block diagram form an overview of a diesel engine outputting exhaust gas to an exhaust gas after-treatment system.

Attention is directed to FIG. 1, which provides in block diagram form an overview of a compression ignition engine 10, such as a diesel engine, outputting exhaust gas to an exhaust after-treatment system 12 which may include a diesel oxidation catalyst (DOC) chamber 14 which connects to a diesel particulate filter (DPF) 16 which then feeds the selective catalyst reduction (SCR) system 20. The DOC 14 can serve to convert NO to $NO_2$ and remove hydrocarbons (HC) according to the following general reactions:

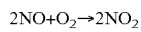

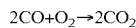

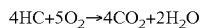

A diesel emission fluid (DEF) injector and reservoir is provided at 18 which contains an aqueous based urea solution that now also includes a catalyst precursor. Preferably aqueous urea based solutions that are employed typically include those having 30.0 wt. % to 40.0 wt. % urea, and preferably 32.5 wt. % urea.

The catalyst precursor herein is preferably one that has a requisite amount of solubility in the aqueous urea solution and which then is capable of decomposition at temperatures similar to those that are relied upon to convert urea into ammonia. Preferably, the temperature range for decomposition of the catalyst precursor is 45° C. to 180° C., more preferably in the range of 75° C. to 125° C. Such catalyst precursors, upon decomposition at such temperatures in the exhaust gas after-treatment system will then operate to provide a target catalyst which serves to achieve one or more of the following: (1) hydrolyze the isocyanic acid to form ammonia to assist in SCR; (2) reduce and/or eliminate the build-up of relatively higher molecular weight deposits that would otherwise be formed from the isocyanic acid; and (3) decompose the relatively higher molecular weight deposit compounds found in the exhaust gas after treatment system, such as within the SCR system 20 (e.g., biuret, triuret, cyanuric acid, ammelide, ammeline, and/or melamine). This decomposition is contemplated to occur at temperatures that are lower than the temperatures that are typically relied upon for their thermal decomposition (e.g. pyrolysis) and removal.

The catalyst precursors herein preferably include water soluble organometallic compounds that will upon decomposition provide the catalytic activity noted above. Preferably, such organometallic compounds include titanium acetates such as titanium(IV) acetate ($C_8H_{12}O_8Ti$) which is water soluble and has a boiling point of 117° C. and which is therefore suitable for use as part of the diesel emission fluid. Upon heating (exposure to elevated temperature exhaust gases) the titanium(IV) acetate will decomposes to provide catalytic titanium oxide which may proceed according to the following general reaction:

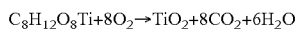

Accordingly, the titanium oxide ($TiO_2$) as the target catalyst will now conveniently serve to improve the exhaust gas treatment by hydrolyzing the isocyanic acid present to ammonia in order to reduce and/or eliminate the build-up of relatively higher molecular weight deposits. In addition, as noted, the $TiO_2$ can also allow for decomposition of any relatively high molecular weight deposits that may be present, and allow for such decomposition at relatively lower temperatures than ordinarily used for thermal (pyrolytic) decomposition.

Other water soluble organometallics that may be combined in the DEF are contemplated to include titanium(IV) bis(ammonium lactato)dihydroxide ($C_6H_{18}N_2O_8Ti$), which is another water soluble titanium complex and is available as a 50 wt. % in water solution (Sigma-Aldrich) with a flash point of 27° C. Accordingly, upon exposure to elevated temperatures in the exhaust gases, the following accounts for the formation of the target titanium dioxide catalyst:

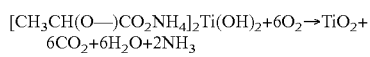

Another candidate catalyst precursor is contemplated to include titanium(III)oxalate decahydrate ($Ti_2(C_2O_4)_3$·$10H_2O$). It may therefore be appreciated the preferably, the catalyst precursor may therefore comprise one or more of titanium(IV) acetate, Ti(IV)bis(ammonium lactato)dihydroxide or titanium(III)oxalate. Accordingly, mixtures of such water soluble organometallic catalyst precursors may be employed.

Other preferred catalyst precursors are contemplated to include ammonium titanyl oxalate (ATO), $C_4O_9N_2H_8Ti$, having the following structure:

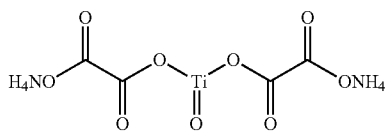

A still further preferred precursor includes titanium oxyacetylacetonate, $C_{10}H_{14}O_5Ti$ having the following structure:

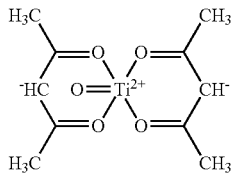

A still further preferred precursor includes $Zr^{4+}$ compounds such as zirconia dioxide ($ZrO_2$). Similar to $TiO_2$ disclosed above, it is contemplated that $ZrO_2$ can similarly serve to improve the exhaust gas treatment by hydrolyzing the isocyanic acid present to ammonia:

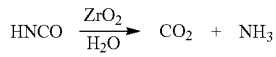

It is therefore contemplated herein that with respect to a given urea-water solution containing a catalyst precursor comprising a water soluble organometallic compound, such as an organometallic compound as noted above that decomposes to form $TiO_2$, one may include a $Zr^{4+}$ type compound, such as $ZrO_2$. As may now be appreciated, in the event that isocyanic acid deposits are formed on the walls of the exhaust system or SCR catalyst, the $ZrO_2$ can additionally serve to reduce such deposits and improve SCR performance.

Therefore, in the broad context of the present disclosure, the organometallic compounds are preferably selected from organo-titanium compounds, which as noted have solubility in water, wherein the solubility is preferably at a level sufficient to allow the organo-titanium compound, as the catalyst precursor, to decompose in the exhaust gases and provide a sufficient amount of catalyst ($TiO_2$) to then hydrolyze the isocyanic acid present to ammonia. Such water solubility of the organometallic compound catalyst precursor in water is contemplated to be at a level of 0.1 wt. % to 25.0 wt. %, more preferably in the range of 0.1 wt. % to 10.0 wt. %, as well as 0.1 wt. % to 5.0 wt. %. The solubility is such that it is contemplated to be maintained at a temperature range between −11° C. (the freezing point of a 32.5% urea water solution) and 50° C.

It is further contemplated the amount of catalyst, derived from the water soluble organometallic precursor, is then preferably formed in the exhaust after-treatment system 12 at a level of 0.01 wt % to 1.0 wt % within the introduced DEF comprising the aqueous urea solution. Accordingly, one may preferably employ an amount of, e.g. titanium(IV) acetate ($C_8H_{12}O_8Ti$) precursor in the aqueous urea solution, such that upon delivery and decomposition to titanium oxide in the exhaust gas after-treatment system, the level of titanium oxide in the injected DEF is in the range of 0.01 wt. % to 1.0 wt. %. Moreover, as alluded to above, one may optionally include $ZrO_2$ in the urea water solution to augment the ability to reduce isocyanic acid deposits. Therefore, it is contemplated that the level of $ZrO_2$ in the urea-water solution, either on its own or in combination with the organometallic precursor catalyst, is similarly in the range of 0.01 wt % to 1.0 wt. %.

Figure 2:
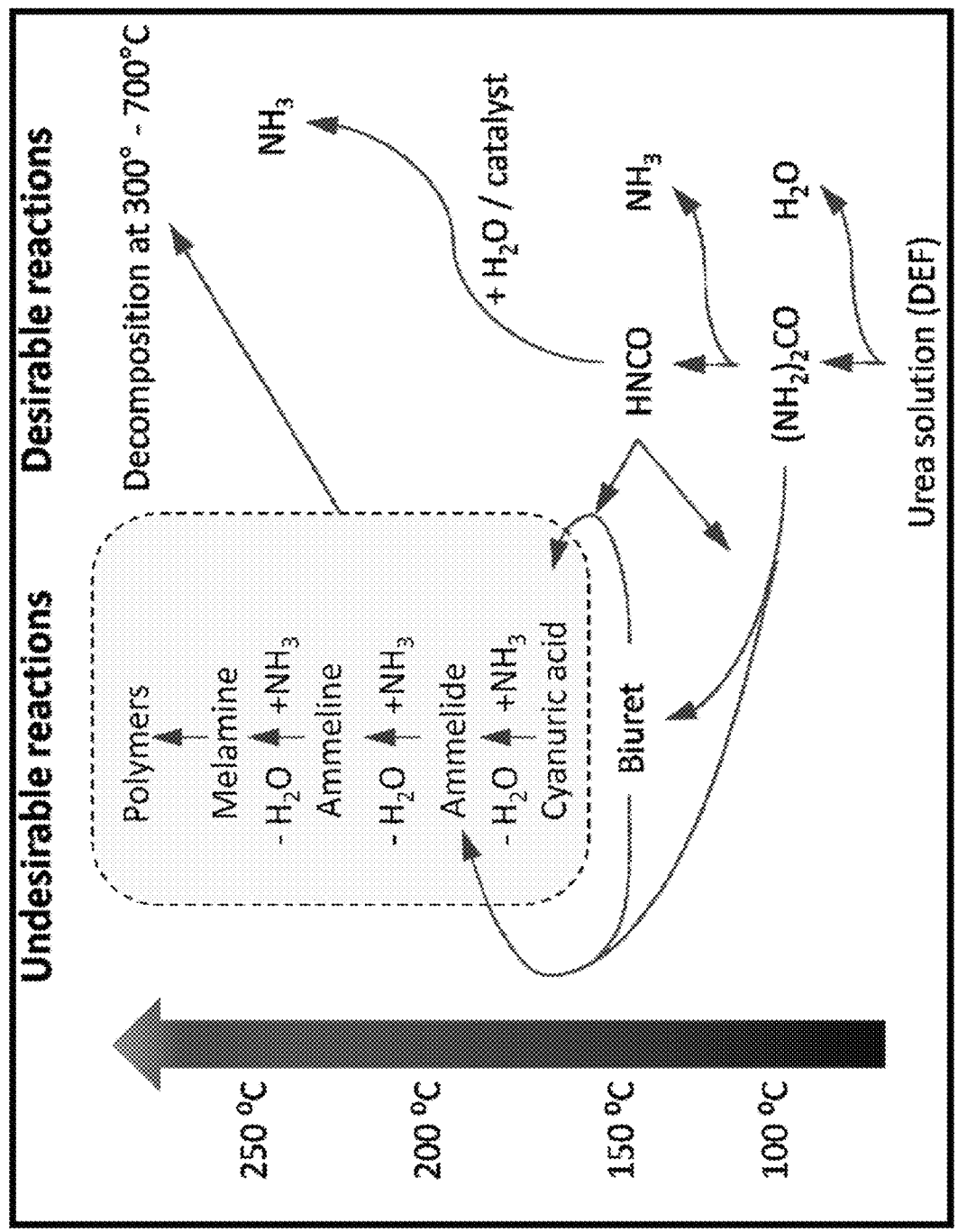
FIG. 2 illustrates the potential reactions of urea in the exhaust gas environment of a SCR system.

Attention is next directed to FIG. 2 which now provides another useful overview of the disclosure herein. As can be seen, the DEF (aqueous urea solution) upon exposure to heat from the exhaust gases (~100° C.) will decompose to provide both isocyanic acid and the desirable ammonia for feeding to the SCR system. The isocyanic acid will then be prone to convert, via what is broadly identified as an undesirable reaction pathway, to the relatively higher molecular weight compound deposits, containing one or more of biuret, cyanuric acid, ammelide, ammeline, melamine and other macromolecular and polymer type compounds. Such compounds will then compromise the efficiency of the SCR system to reduce levels of NOx.

Accordingly, by placement of the catalyst precursor herein into the DEF, as shown in FIG. 2, the catalyst precursor is such that upon exposure to exhaust gases and temperatures preferably in the range of about 100° C. to 300° C., the catalyst precursor (soluble organometallic compound) is converted into catalyst (e.g. titanium oxide) and the catalyst reduces or eliminates the conversion of the isocyanic (HNCO) to the relatively high molecular weight deposits. Instead, as illustrated, the isocyanic acid is converted to additional amounts of ammonia for the SCR process. It is noted that deposit formation may be particularly prominent at temperatures in the range of 185° C. to 250° C. Accordingly, the use of the catalyst precursors herein to reduce deposition formation that occur in the temperature range of 185° C. to 250° C. is particularly advantageous.

In addition, the catalyst precursors herein can serve to facilitate a relatively lower temperature degradation of the relatively high molecular weight compounds forming the deposits comprising biuret, cyanuric acid, ammelide, ammeline and melamine, and such degradation may now occur in the temperature range of 130° C. to 300° C.

Figure 3C:
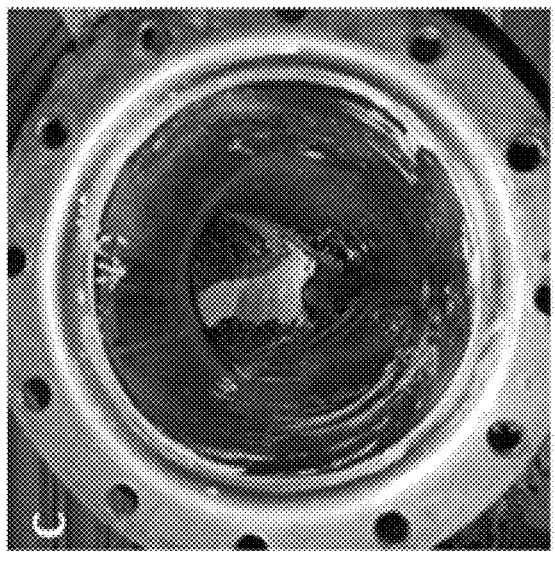
FIG. 3C illustrates the effect of urea water solution without the addition of ATO with respect to deposit formation.
Figure 3B:
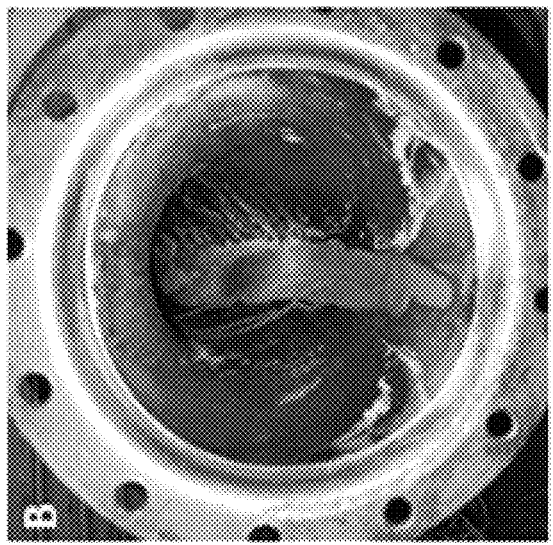
FIG. 3B illustrates the effect of ATO addition at 0.05 mol % to urea water solutions with respect to deposit formation.
Figure 3A:
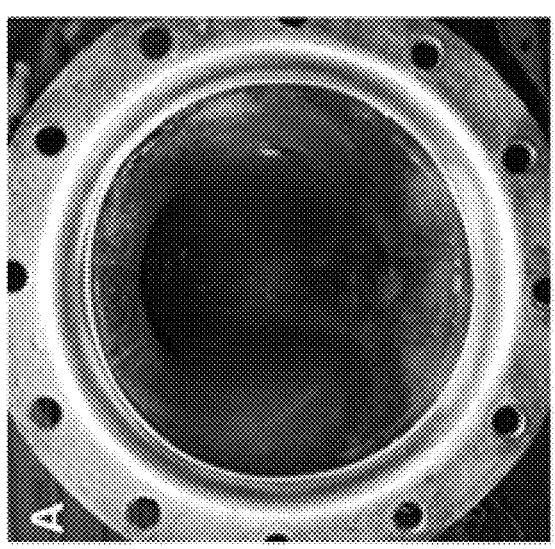
FIG. 3A illustrates the effect of ATO addition at 0.1 mol % to urea water solutions with respect to deposit formation.

Reference is next made to FIG. 3 which illustrates in identified images "A", "B" and "C" how the addition of ATO to a urea water solution can impact the formation of deposits. FIG. 3 image "A" has the highest concentration of ATO at 0.1 mol % (1.74 g ATO/liter UWS). FIG. 3 image "B" has a concentration of 0.05 mol % ATO, (0.87 g ATO/liter UWS). FIG. 3 image "C" is UWS without addition ATO. It is apparent that increasing the concentration of ATO incorporated into the UWS results in a decrease in the amount of formed deposits.

Figure 4:
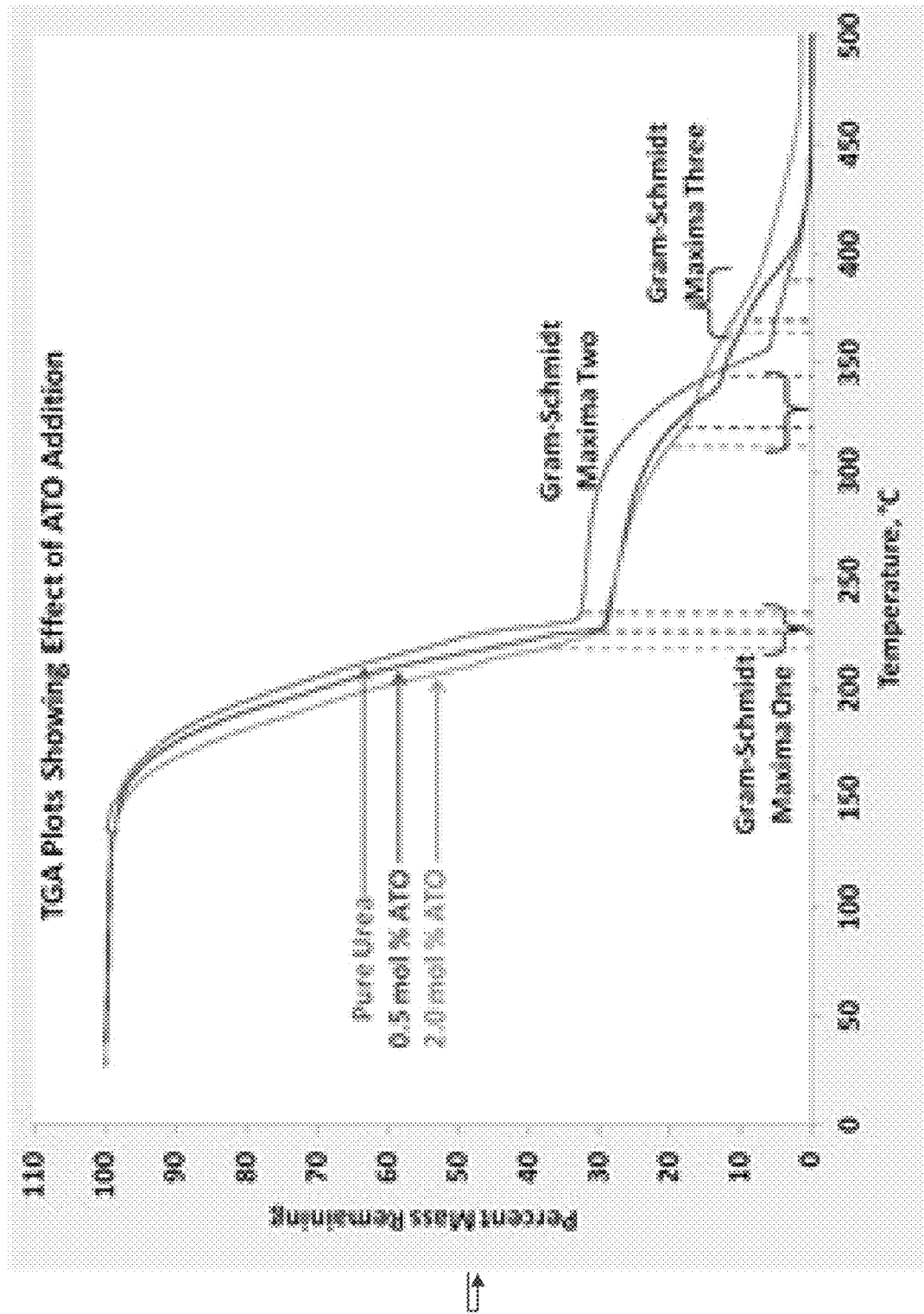
FIG. 4 illustrates the effect of ATO addition to urea water solutions evaluated by thermogravimetric analysis (TGA).

Reference is next made to FIG. 4 which identifies the use of thermogravimetric analysis (TGA) coupled to a Fourier Transform Infrared (FTIR) spectrophotometer. Samples were prepared by incorporating the identified concentration of ATO with urea via lyophilization (freeze drying). Samples then underwent TGA and the evolved gases were analyzed using IR spectroscopy. FIG. 4 shows the overlaid TGA data from three samples: pure urea, 0.5 mol % ATO in urea, and 2.0 mol % ATO in urea. The Gram-Schmidt values shown in the plot are an indication of the temperature at which the maximum amounts of gasses from the sample were evolved. As a general trend, the maximum off-gassing events occurred at lower temperatures as the concentration of ATO in the sample increased. The decrease in the temperatures of Gram-Schmidt maxima indicates that ATO catalyzes the overall decomposition of urea as given by the following reaction:

$$CO(NH_2)_2 + H_2O \rightarrow 2NH_3 + CO_2$$

An addition testing evaluation was run to further confirm the use of the catalyst precursors herein to reduce deposits. Two conditions were considered. Condition 1 consisted of a moderate duty cycle injection at relatively low temperature. More specifically, a DEF injector duty cycle of 13.1%, a target gas temperature of 215° C., engine speed of 1375 rpm, exhaust flow of 670 kg/hr for a time of 1.0 hour. Condition 2 consisted of a high duty cycle injection at high temperature. In both cases after 1.0 hour the exhaust pipe was disassembled and deposits were collected and weighed.

For Condition 1, and utilizing a DEF, namely a urea water solution, after 1.0 hour of operation 0.4 g of deposits were recovered from the mixer region and 4.2 g were recovered from the elbow region, with a total amount of deposits of 4.6 g. By contrast, when using 0.2 mol. % ATO in the same urea water solution, only 0.2 g of deposits were recovered from the mixer region and only 0.7 g of deposits were recovered from the elbow region for a total mass of recovered deposits of 0.9 g. As may therefore be appreciated, in the absence of the ATO catalyst precursor the deposit mass increased 411% (0.9 g versus 4.6 g). For Condition 2, and again utilizing a urea water solution, after 1.0 hour of operation, 6.4 g of deposits were recovered from the mixer region. By contrast, when using 0.2 mol. % ATO in the same urea water solution, only 3.5 g of deposits were recovered from the mixer region. As may therefore be appreciated, in the absence of the ATO catalyst precursor the deposit mass increased 45% (6.4 g versus 3.5 g).

Accordingly, some of the remarkable benefits of the aforementioned use of the catalyst precursors herein therefore includes the ability to now improve emissions by allowing for DEF injection at relatively lower exhaust temperatures (e.g. 185° C. to 250° C.) to then reduce deposit formation that otherwise compromises the efficiency of the SCR system. In other words, the catalyst precursors herein will provide for reduced cold start emissions on vehicles equipped with a SCR catalyst. In addition, the reduction in deposit formation as described herein is such that it is contemplated to reduce system backpressure. System backpressure in turn results in an increase in fuel consumption. By reducing deposits there will therefore be a reduction in fuel consumption in the vehicle. In addition, by reducing deposits, the requirement for a high temperature regeneration period to breakdown and remove the deposits can be reduced or avoided. Furthermore, the identified high molecular weight deposits herein are such that they tend to have corrosive effects when in contact with the metals utilized in exhaust piping. Reduction or removal of such deposits therefore is contemplated to extend the lifetime of the metallic exhaust system and reduce or eliminate loss of its structural integrity.

As can now be appreciated from all of the above, the injection of an aqueous based urea solution containing a catalyst precursor comprising a water soluble organometallic compound is an effective method to reducing deposits. However, it has also been observed that the stability of the organometallic catalyst precursor can become an issue with fluctuations in the pH of the aqueous based urea solution containing the precursor. As the temperature of the aqueous based urea solution increases, the alkalinity of the solution also increases due to an increase in the concentration of dissolved ammonium and hydroxide ions. This shift in pH can then cause the organometallic compound to precipitate out of solution and reduce its effectiveness. Accordingly, it has now been recognized that it is preferable to monitor and maintain the pH of the aqueous based urea solution containing the organometallic catalyst precursor within an appropriate pH window. More specifically, it is preferable to monitor and maintain the pH of the aqueous based urea solution containing the organometallic catalyst precursor to a pH of less than or equal to 10.0 (i.e. ≤10.0), and in a more preferred embodiment, to a pH in the range of 7.0 to 10.0.

Figure 5:
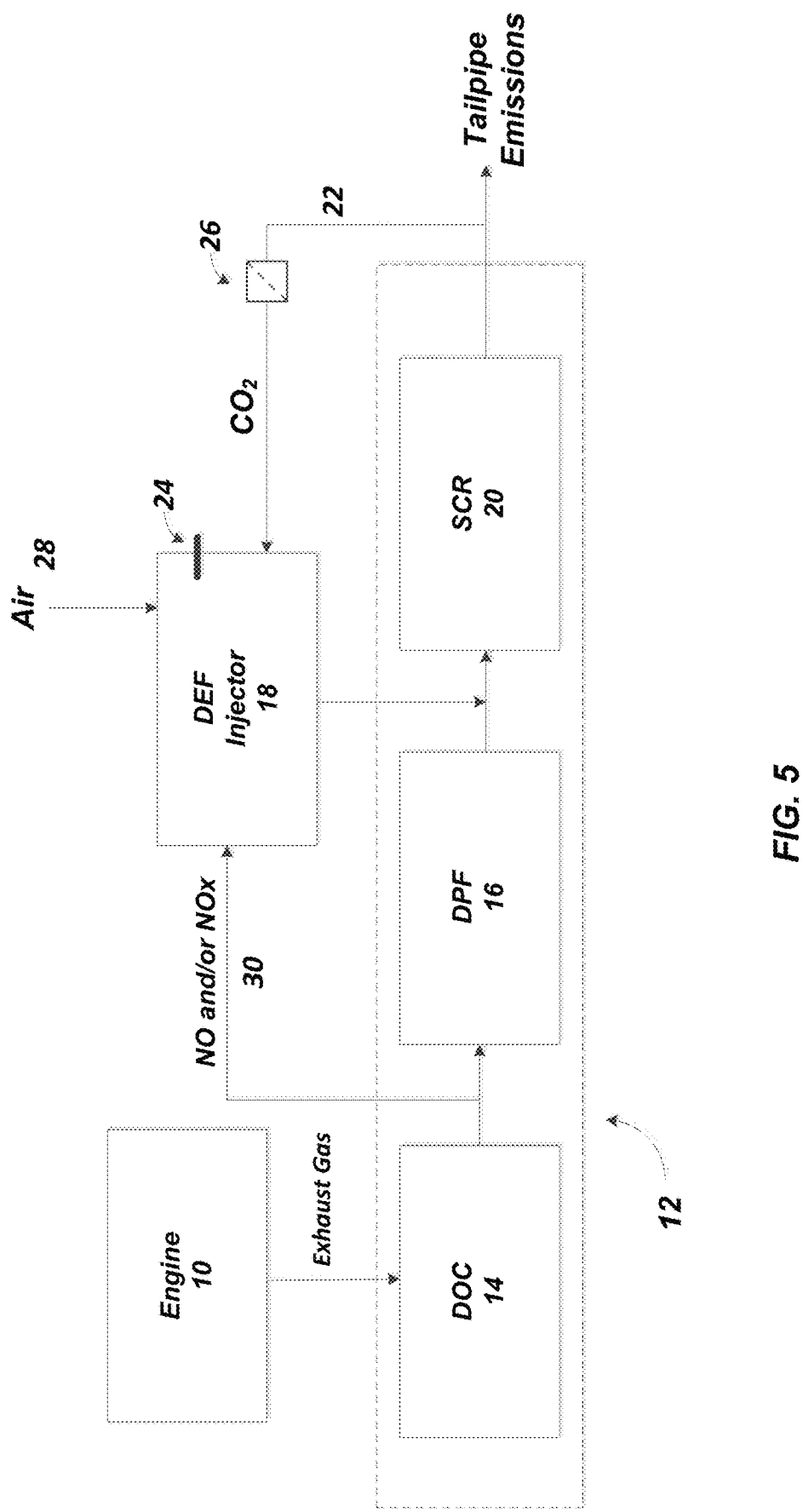
FIG. 5 illustrates in block diagram an overview of a diesel engine outputting exhaust gas and the use of pH control to regulate the pH of the diesel emissions fluid reservoir.

With attention directed to FIG. 5, it is noted that tailpipe exhaust includes carbon dioxide ($CO_2$) emissions which can be present at levels of 6.0% to 16.0% by volume. Accordingly, as illustrated in FIG. 5, and shown generally at pathway 22, it is contemplated that one can recirculate a portion of the exhaust gas containing $CO_2$ into the aqueous based urea solution containing the organometallic catalyst precursor. The following may then occur to form carbonic acid:

$$CO_2 + H_2O \rightarrow H_2CO_3$$

As a result of the introduction of $CO_2$ and the ensuing formation of carbonic acid ($H_2CO_3$), the alkalinity of the aqueous based urea solution containing the organometallic precursor contained in reservoir 18, which otherwise may tend to increase due to temperature increases, can be regulated to maintain the pH to a value of ≤10.0 and in particular, to remain in the range of 7.0 to 10.0. Accordingly, it is also preferable to place a pH indicator, such as an ion selective electrode or pH probe with feedback, into the aqueous based urea solution containing the organometallic precursor, as shown generally at 24. In addition, in a more preferred configuration, the tailpipe exhaust pathway 22 may include a $CO_2$ membrane filter 26 to filter out and only allow passage of $CO_2$ from the tailpipe emissions. Such membrane may preferably include the $CO_2$ membrane described in U.S. Pat. No. 8,454,732. It may therefore be appreciated that by monitoring the ion selective electrode or pH indicator 24, one can selectively control the amount of $CO_2$ to maintain the pH of the aqueous based urea solution containing the organometallic precursor to the desired levels noted herein.

Furthermore, as can be see, an air intake 28 can be provided to the reservoir 18. Accordingly, if the urea water solution containing the organometallic precursor becomes acidic (e.g. a pH of less than 7.0 due to a relative high concentration of $CO_2$ and ensuing carbonic acid formation, air may be introduced which is also contemplated to then reduce the $CO_2$ concentration within reservoir 18 so that acidic pH can be minimized or avoided. Accordingly, one can therefore again monitor pH probe 24 and in the event that pH of the reservoir containing the aqueous based urea solution and organometallic catalyst precursor becomes acidic or begins to drop in pH at unacceptable rate, one may introduce air to attenuate or prevent such pH changes.

Furthermore, within the DOC chamber 14 there is conversion of NO to $NO_2$ and therefore, a portion of exhaust immediately upstream of chamber 14 may be routed into the reservoir 18 containing the urea water solution and organometallic precursor, via pathway 30. The introduction of NOx (NO and/or $NO_2$) will hydrolyze in water and form nitric acid ($HNO_3$) and/or nitrous acid ($HNO_2$). The introduction of such acids into the chamber 18 will therefore again serve to provide acidity and control the pH of the aqueous urea solution and organometallic catalyst precursor from achieving a pH value of greater than 10.0 due to temperature increase, as described herein.

From the above, it should now be apparent that the control of the pH level of a diesel emissions fluid reservoir comprising an aqueous based urea solution including a catalyst precursor comprising a water soluble organometallic compound, may be achieved by implementing one or more of the following pH adjusting procedures: (1) introducing exhaust gas comprising $CO_2$ into the reservoir; (2) introducing air into the reservoir; and/or (3) introducing NOx (NO and/or $NO_2$). Preferably, one may therefore select and implement one, two or all three of these pH adjusting procedures. Such control may be implemented by a computer processing unit programmed to monitor pH of the reservoir 18 and receive pH readings and select one or more of the above identified pH adjusting procedures to maintain pH at a value of ≤10.0, and as noted, preferably within the range of 7.0 to 10.0.

What is claimed is:

1. A method of controlling tie a pH level of a diesel emission fluid comprising:
    (a) providing a diesel emission fluid reservoir containing an aqueous based urea solution including a catalyst precursor comprising a water soluble organometallic compound, wherein said reservoir includes a pH probe to monitor a pH of said solution;
    (b) controlling the pH to a value of ≤10.0.

2. The method of claim 1 wherein said pH is controlled to a value in the range of 7.0 to 10.0.

3. The method of claim 1 wherein said pH is controlled by introducing exhaust gas comprising $CO_2$ into said reservoir.

4. The method of claim 1 wherein said pH is controlled by introducing air into said reservoir.

5. The method of claim 1 wherein said pH is controlled by introducing NOx into said reservoir.

6. The method of claim 1 wherein said water soluble organometallic compound is soluble in said aqueous based urea solution at a level of 0.1 wt. % to 25.0 wt. %.

7. The method of claim 1 wherein said water soluble organometallic compound comprises an organo-titanium compound which converts to a titanium oxide catalyst.

8. The method of claim 7 wherein said titanium oxide catalyst is formed at a concentration of 0.01 wt. % to 1.0 wt. % in said diesel emissions fluid.

9. The method of claim 7 wherein said water soluble organo-titanium compound comprises titanium(IV) acetate.

10. The method of claim 7 wherein said water soluble organo-titanium compound comprises titanium(IV) bis(ammonium lactato)dihydroxide.

11. The method of claim 7 wherein said water soluble organo-titanium compound comprises titanium(III)oxalate.

12. The method of claim 7 wherein said water soluble organo-titanium compound comprises ammonium titanyl oxalate.

13. The method of claim 7 wherein said water soluble organo-titanium compound comprises titanium oxyacetylacetonate.

14. The method of claim 1 wherein said diesel emission fluid also contains zirconium dioxide.

15. A method of controlling a pH level of a diesel emission fluid comprising:
    (a) providing a diesel emission fluid reservoir comprising an aqueous based urea solution including a catalyst precursor comprising a water soluble organometallic compound, wherein said reservoir includes a pH probe to monitor a pH of said solution;
    (b) controlling the pH to a value of ≤10.0 by selecting and implementing at least two of the following pH adjusting procedures:
        (i) introducing exhaust gas comprising $CO_2$ into said reservoir;
        (ii) introducing air into said reservoir;
        (iii) introducing NOx into said reservoir.

16. The method of claim 15 wherein said pH is controlled to a value in the range of 7.0 to 10.0.

17. A diesel emission fluid apparatus comprising:
    a diesel emission fluid reservoir to contain an aqueous based urea solution including a catalyst precursor comprising a water soluble organometallic compound, wherein said reservoir includes a pH probe to monitor pH of said solution;
    a controller which monitors said pH that is configured to control said pH to a level of ≤10.0 by selecting and implementing at least one of the following:
        (i) introducing exhaust gas comprising $CO_2$ into said reservoir;
        (ii) introducing air into said reservoir; or
        (iii) introducing NOx into said reservoir.

* * * * *